Feb. 14, 1956   R. W. JENSEN   2,734,442
DUAL DIFFERENTIAL AND RATIO LOCKOUT MECHANISM
Filed June 28, 1950   5 Sheets-Sheet 1

RAYMOND W. JENSEN,
INVENTOR.

BY

ATTORNEY

RAYMOND W. JENSEN,
INVENTOR.

ATTORNEY

RAYMOND W. JENSEN, INVENTOR.

ATTORNEY

United States Patent Office 2,734,442
Patented Feb. 14, 1956

2,734,442

DUAL DIFFERENTIAL AND RATIO LOCKOUT MECHANISM

Raymond W. Jensen, Los Angeles, Calif., assignor to The Garrett Corporation, Los Angeles, Calif., a corporation of California Application June 28, 1950, Serial No. 170,930

25 Claims. (Cl. 98—1.5)

This invention relates generally to pressure control mechanisms, and relates more particularly to mechanism for controlling the pressure within an enclosure.

While the invention has particular utility in connection with pressurized ventilation of aircraft cabins and the like, and is shown and described herein as embodied in such a conditioning system, it is to be understood that its utility is not limited thereto.

Various cabin pressurizing systems are used for aircraft cabins. In one such system, for example, cabin pressure is permitted to remain substantially the same as ambient atmospheric pressure until a predetermined altitude has been reached, is maintained at a substantially constant pressure between that altitude and a second predetermined higher altitude. Between the second predetermined altitude and a third predetermined higher altitude, the cabin pressure is maintained at a substantially fixed differential relative to external atmosphere, and above said third predetermined altitude said cabin pressure is maintained at a substantially fixed ratio with respect to ambient atmospheric pressure. In the isobaric range of operation of such a system, wherein cabin pressure is maintained substantially constant, there will be a fairly rapid increase in the ratio between cabin pressure and atmospheric pressure; in the differential range of operation, wherein a substantially fixed differential between cabin pressure and ambient pressure is maintained, the ratio between cabin and ambient pressure will continue to increase as the aircraft continues to gain altitude. The ratio control limits the pressure differential between that in the cabin and ambient atmosphere in such a manner that the differential pressure between the cabin and ambient atmosphere decreases with increasing altitude.

It is particularly desirable to limit the ratio in military aircraft in order to avoid the injurious effects on the human body of explosive decompression which results from a sudden release of pressure from within the cabin when the cabin has been badly ruptured in combat. In explosive decompression, which occurs when the cabin wall has been perforated or ruptured in combat, the sudden drop in pressure within the cabin may have serious if not fatal, effect on the personnel within said cabin.

In this connection it is to be noted that up to an aircraft altitude of approximately 32,000 feet, the human body can stand a sudden decompression of the order of 5.0 p. s. i. pressure differential. Above 32,000 feet the decompression differential which the human body can withstand drops off rapidly, and it is for this reason that the ratio control is provided.

However, when the cabin pressure is under a ratio control, the differential between cabin and ambient atmospheric pressure decreases rapidly with increasing altitude and approaches zero at extreme altitudes, so that in effect the cabin becomes almost unpressurized.

Not only is such low pressure at extreme altitudes unduly uncomfortable to the body, but at the least, becomes a dangerous health factor in that the human blood boils when the pressure of air surrounding the body is reduced to approximately 0.95 inch Hg absolute (0.465 p. s. i.), and this condition occurs at a cabin altitude of approximately 62,000 feet. Hence, no aircraft cabin (or other enclosure occupied by human beings) should ever have a pressure of less than 1.0 inch Hg absolute (0.49 p. s. i.).

The present invention solves the problems involved under the various conditions described above, and provides a control mechanism which will most advantageously control the pressure conditions within the cabin under the various conditions which will be encountered in the operation of the aircraft, particularly military aircraft.

Another object of the invention is to provide mechanism for controlling the pressure within an aircraft cabin in such a manner that cabin pressure will be substantially the same as ambient atmospheric pressure up to a predetermined altitude.

Still another object of the invention is to provide a device of this character, wherein cabin pressure will remain substantially constant between said predetermined altitude and a second predetermined altitude.

A further object of the invention is to provide a device of this character wherein cabin pressure will be maintained at a substantially fixed high differential relative to ambient atmospheric pressure between said second predetermined altitude and a third higher predetermined altitude.

A still further object of the invention is to provide a device or mechanism of this character wherein cabin pressure will be maintained at a predetermined ratio relative to ambient atmospheric pressure between said third predetermined altitude and a fourth higher predetermined altitude.

Another object of the invention is to provide a device or mechanism of this character wherein cabin pressure will be maintained at a substantially fixed low differential pressure with respect to ambient atmospheric pressure above said fourth predetermined altitude.

Still another object of the invention is to provide a control mechanism which will perform the above functions in a single unit.

Under certain conditions it may be desirable to render the ratio control portion of the mechanism inoperative so that the aircraft cabin pressure will be regulated on high differential in all aircraft altitudes above the second predetermined altitude mentioned above, and hence, it is another object of the invention to provide a device of the present character having means wherein the ratio control portion of the mechanism may be rendered inoperative, so that the cabin pressure will be controlled by the high differential control portion of the mechanism.

It is still another object of the invention to provide mechanism of this character wherein the changeover of cabin pressure from low differential or ratio control to ratio lockout (and thus to high differential) is accomplished at a predetermined rate, so that no implosive compression will occur.

A further object of the invention is to provide a device or mechanism of this character that is of extremely simple and relatively inexpensive construction.

Other objects and advantages of the invention will be brought out in the following part of the specification.

Referring to the drawings, which are for illustrative purposes only.

Figure 1:
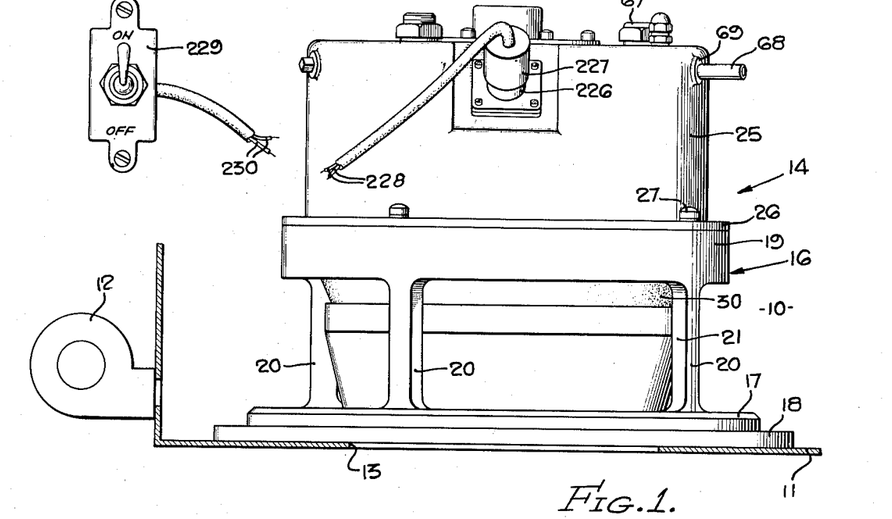
Fig. 1 is a side elevation of a pressure control mechanism embodying the invention, said mechanism being installed in a pressurized aircraft cabin.

Referring to Fig. 1, there is shown a diagrammatic representation of a cabin pressure control system of which the present invention constitutes a component. An enclosure or cabin 10 has a wall 11, said cabin being supplied by air under pressure by any suitable means, such as an air pump or superchanger 12, which may be operated by any suitable source of power, not shown, for maintaining a flow of air into said cabin for purposes of ventilation. The cabin wall 11 is provided with an outflow opening 13 which is controlled by a valve mechanism, indicated generally at 14, embodying the present invention, and which is mounted within the enclosure or cabin. This valve mechanism is capable of directly controlling the cabin pressure by regulating or controlling the discharge of air from said cabin through the opening 13 into the ambient atmosphere. Broadly, the valve mechanism controls the flow of air relative to the enclosure or cabin.

Figure 2:
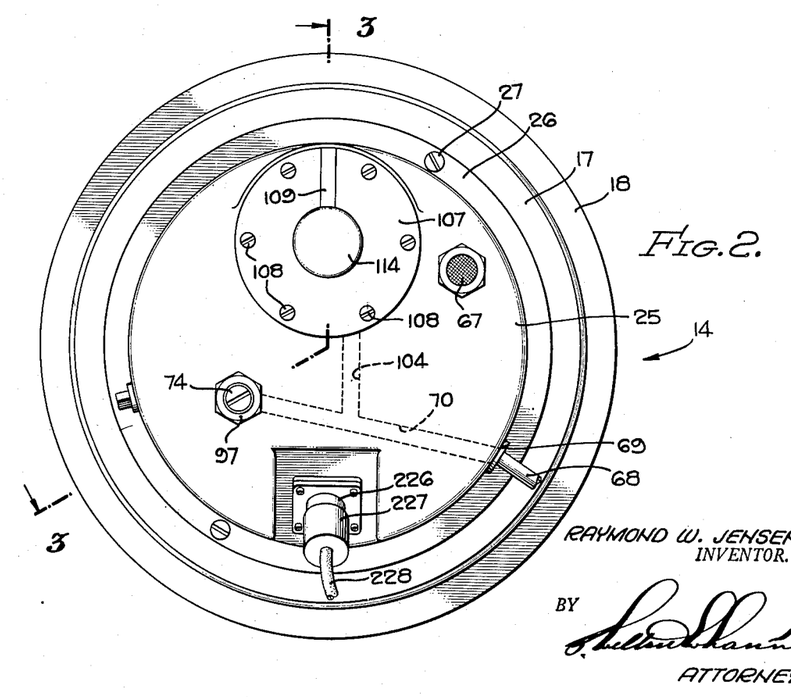
Fig. 2 is a plan view of the pressure regulating mechanism shown in Fig. 1.
Figure 3:
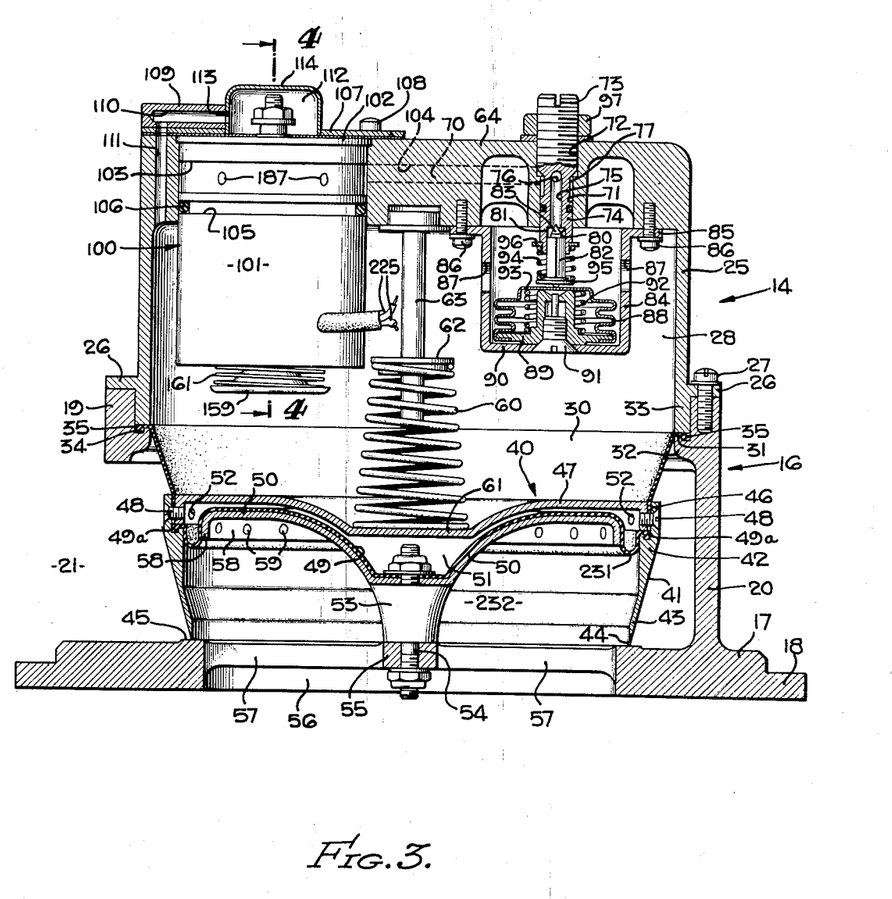
Fig. 3 is a sectional view taken on line 3—3 of Fig. 2.

Referring to Figs. 1, 2 and 3, the mechanism 14 comprises a base assembly, indicated generally at 16, which has a base 17 provided with an outwardly extending annular flange 18, for attachment to the cabin or the like, by any suitable known means, such as bolts. The base assembly includes a cylindrical part 19 spaced axially from the base 17, and connected thereto by annularly spaced struts 20, thereby providing openings 21 in the base assembly for the passage of air therethrough.

A generally cylindrical cup-shaped head 25 is provided with an outwardly extending annular flange 26 secured to the part 19 by screws 27, said cup-shaped head providing an interior chamber 28. The pressure in the chamber 28 is controlled, as will be hereinafter described, and said chamber is designated herein as a control pressure chamber.

An annular ring-like diaphragm 30 is provided at the free end of the head, and said diaphragm is frustoconical and adapted to roll in a convolution, as will be more fully described hereinafter. The outer edge portion of the diaphragm 30 is clamped between a shoulder 31 and the free end of the cover 25. The shoulder 31 is provided by an inwardly extending flange 32, and the free end or edge of the cover 25 is adapted to clampingly engage said diaphragm by reason of a portion 33, as shown in Fig. 3, which extends below the flange 26. The shoulder 31 has a groove 34 therein, for reception of a peripheral bead 35, formed on the diaphragm 30.

The inner edge portion of the diaphragm 30 is secured to a movable valve assembly, indicated generally at 40, and comprising a movable valve member 41. The valve member 41 is annular in shape and includes an upper portion 42, as viewed in Fig. 3, which is relatively thick, and a frusto-conical end portion 43 having its free edge sharpened to provide a thin valving edge 44 which, when the valve assembly 40 is moved downwardly, is adapted to engage a flat annular seat 45 to prevent the outflow of cabin air through the valve mechanism.

The upper portion of the valve member is enlarged at 46 for reception of a valve cover 47. The inner edge portion of the diaphragm 30 is clamped between the periphery of the cover 47 and the vertical wall of the enlarged cylindrical part 46 of the movable valve member 41, screws 48 secure the cover 47 to the valve member 41.

Beneath the cover 47 is a diaphragm 49 which is marginally clamped between the cover 47 and a shoulder formed at the bottom of the enlarged cylindrical part 46. The diaphragm 49 also includes a marginal bead 49a which is received in a groove provided therefor in said shoulder.

Beneath the diaphragm 49 is a baffle 50 which is spaced from the cover 47 when the valve member 41 is in the closed position. The spacing of said baffle from the cover 47 is sufficient to provide room for the diaphragm 49 and also leave a limited space providing a chamber 51 connected with the cabin by means of openings 52 in the valve member 41 and cover 47.

The baffle 50 and the diaphragm 49 are centrally attached to a pedestal 53 by a bolt 54, whereby the assembly is attached to a boss 55 axially disposed in an opening 56 provided in the base 17, said boss 55 being attached to the base by means of radial webs 57 which are spaced apart so as to permit the passage of air through the opening 56.

The baffle 50 is provided with a downturned annular flange 58 having annularly spaced openings 59 therein, the purpose of which will be hereinafter described.

The valve assembly 40 is urged in the closing direction by a relatively light spring 60 which reacts against a central depressed part 61 of the valve cover 47 and a spring retainer 62 carried by a support 63 and attached to the end wall 64 of the cover 25, and said support 63 may be axially adjustable to vary the loading of the spring 60.

The chamber 28 is connected with a source of higher pressure, such as the cabin, by means of a restricted bleed 67. The chamber 28 is also connected by a region of lower pressure such as ambient atmosphere by means of a conduit 68, connected to a passage terminating in a boss 69 of the head 25. The wall 64 has a passage 70 therein between the atmospheric connection 68 and a downwardly extending bore 71, having an enlarged portion 72 at the outer end, which is threaded for threadable reception of the threaded end 73 of a plug 74. The plug has a longitudinal passage 75 therein and a cross passage 76 communicating with an annular groove 77, whereby communication between the passage 70 and the passage 75 is effected. This arangement also insures such communication regardless of the adjusted position of the plug 74, the threaded end 73 enabling such adjustment.

An enlarged bore 80 is provided in the inner end of the plug 74, thereby forming a shoulder or valve seat 81 and means for guiding a valve pin 82 slidable in the bore 80 and having a conical tip 83 which is adapted to cooperate with the seat 81 to thereby control the escape of air from the chamber 28 to ambient atmosphere.

A cup-shaped housing 84 is provided with a flange 85, whereby said housing is attached to the wall 64 by means of screws 86. The interior of the housing 84 is connected with the chamber 28 by means of openings 87, and within said housing is an absolute pressure responsive device or bellows 88 having one wall 89 secured to the bottom wall 90 of the housing 84 by means of a screw 91. Within the bellows 88 is a spring 92 urging the opposite end wall 93 of the bellows upwardly, as viewed in Fig. 3. The lower end of the valve pin 82 is urged into engagement with the wall 93 of the bellows 88 by means of a spring 94 which reacts between a spring retainer 95 secured to the lower end of the valve pin 82 and a spring retainer 96 which abuts against a shoulder provided therefor on the plug 74. A locknut 97 is provided on the threaded part 73 of the plug 74 for securing the plug is adjusted positions.

Within the chamber 28 there is also a control unit, indicated generally at 100, including a hollow cylindrical casing 101 which has a flange 102 adjacent its upper end. The unit 100 is received in an opening provided therefor in the wall 64, and said opening includes an enlarged portion which receives the flange 102, the latter resting on a shoulder formed thereby, which supports the unit 100. The casing 101 has an external groove 103 connected by a passage 104 (Figs. 2 and 3) with the passage 70, thereby providing communication with atmosphere. A second groove 105 is provided in the casing 101 for reception of a sealing ring 106, which prevents the passage of air past the unit 100. In order to receive the unit 100 in place, a plate 107 is disposed over the flange 102 and is removably attached to the wall 64 by screws 108. The plate 107 includes an enlarged portion 109 having a bore 110 therein, communicating with a bore 111 in the head 25, which connects with the chamber 28. The bore 110 communicates with a chamber 112 of the unit, by means of a port 113 in a cup-shaped cap 114, so that the control pressure of chamber 28 prevails in the chamber 112, said cap 114 being shown as integral with the plate 107.

Figures 4, 5:
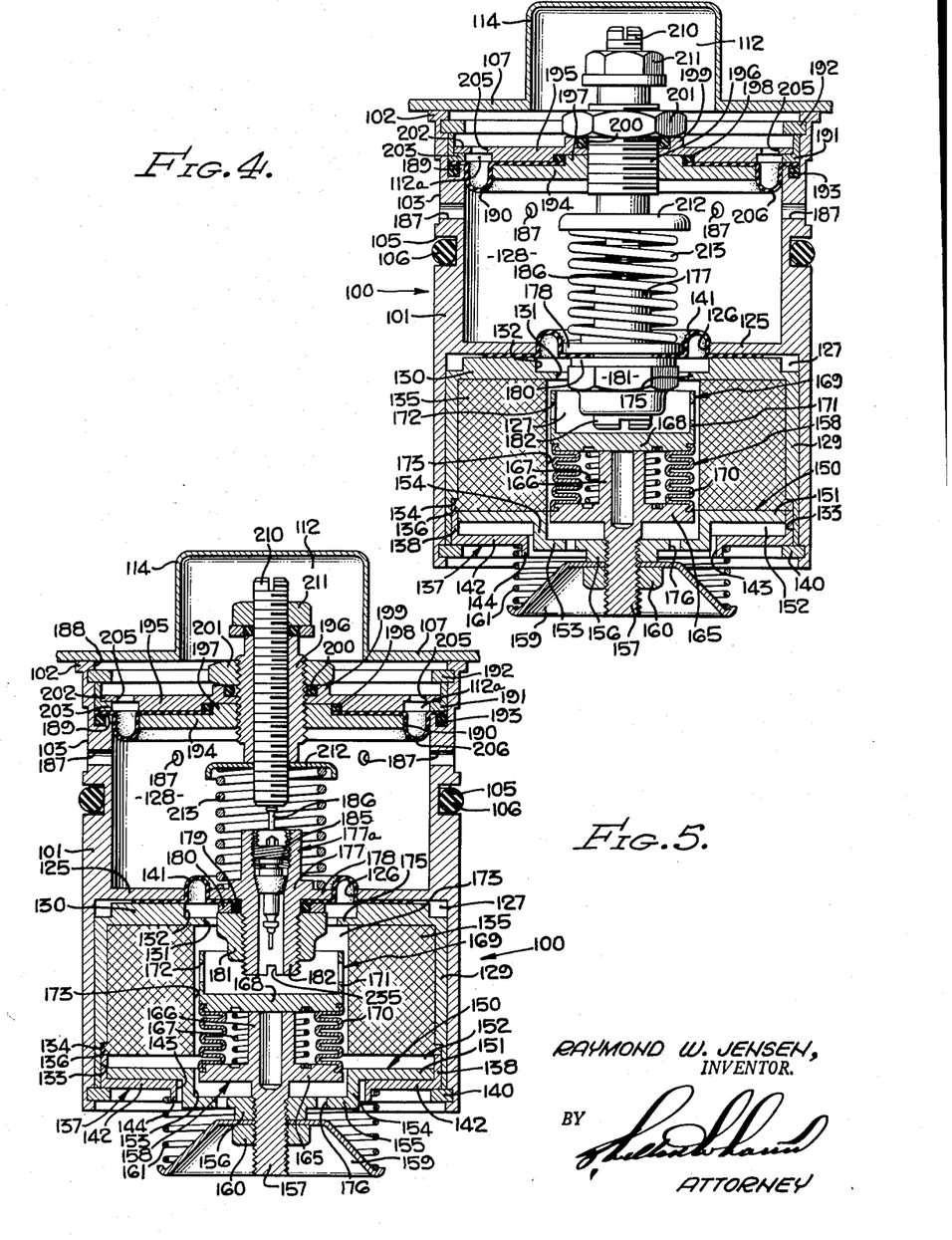
Fig. 4 is a sectional view taken on line 4—4 of Fig. 3, showing the position of certain parts as positioned by the solenoid when energized.
Fig. 5 is a view similar to Fig. 4 but showing the position of said parts when the solenoid is deenergized.

Referring now to Figs. 4 and 5, the interior of the casing 101 is shown as provided with a transverse wall 125 which has a central opening 126 therein, said wall dividing the hollow interior of the casing into a lower compartment 127, as viewed in Figs. 4 and 5, and an upper chamber 128.

Within the compartment 127 is disposed a solenoid comprising a generally cup-shaped shell 129, the closed end of which comprises a wall 130 having a central opening 131 therein and a recess 132 of larger diameter than the opening 131, and of substantially the same diameter as the opening 126 of the wall 125. The free end of the annular wall of the shell 129 is provided with a longitudinally extending internal groove 133 which forms an enlargement of the interior diameter of the shell and provides a shoulder 134 at the inner end of said groove. Within the shell is a solenoid coil 135 having an outwardly extending flange 136 adjacent the outer or lower end, said flange abutting against the shoulder 134. A shallow cup-shaped member, indicated generally at 137, is received within the shell 129, and the annular wall 138 thereof is received in the groove 133, the free end of said wall 138 abutting against the flange 136 of the solenoid to thereby retain the coil 135 in position. A snap ring 140, received in a groove provided therefor in the adjacent end of the casing 101, secures the member 137 in position and also secures the shell 129 in position to thereby clampingly secure the marginal portion of a diaphragm 141 between the wall 130 and the wall 125.

The member 137 includes a bottom wall 142 having a central opening 143 therein, about which is an outwardly turned flange 144, the wall 142 being spaced from the adjacent end of the solenoid coil 135 by the annular wall 138 for a purpose to be hereinafter described.

An armature 150 is provided and includes an annular part 151 disposed in the space 152 provided between the wall 142 and the adjacent end of the solenoid coil 135. Centrally the armature 150 includes a central opening 153 defined by an outwardly extending flange 154 having a wall 155 at the lower end thereof, as shown in Figs. 4 and 5. The wall 155 has an external boss 156 with an axial threaded opening therein for reception of a threaded stem 157 of a bellows assembly indicated generally at 158. An inverted dish-shaped spring retainer 159 is disposed on the stem 157 and secured thereto by a nut 160. A spring 161 reacts between the spring retainer 159 and the wall 142 for urging the assembly 158 downwardly, downward movement of said assembly being limited by engagement of the annular part 151 of the armature with the wall 142, as best shown in Fig. 5.

The assembly 158 includes a plate 165 from which the stem 157 depends, there being an axial upward extension 166 on said plate, about which is disposed a spring 167 having the ends thereof received in respective grooves provided therefor in the plate 165 and bottom wall 168 of a cup-shaped member 169. An evacuated ratio control bellows 170 has its ends connected to the plate 165 and the wall 168. The cup-shaped member 169 includes an annular wall 171 having ports 172 therein, it being noted that the assembly 158 is loosely received in the longitudinal opening 173 which extends through the solenoid coil and that expansion of the bellows 170 is limited by an annular stop 175 comprising part of the wall 130 which is engageable by the upper end of the cupped member 169. Control chamber pressure enters the opening 173 by way of ports 176 in the wall 155 of the armature and passes to the interior of the cupped member 169 through the ports 172 when said member engages the stop 175.

The diaphragm 141, which may be termed a high differential diaphragm, has a central opening for reception of a valve body 177 of a valve, indicated generally at 177a, which has a flange 178 of smaller diameter than the registered openings 126 and 132 in the walls 125 and 130 respectively. A central portion of the diaphragm is clamped between the flange 178 and sealing members 179 and 180 which are secured by means of a nut 181 on the threaded end portion 182 of the valve body 177 depending from the flange 178 disposed below the diaphragm 141. The lower end of the valve body is disposed in operative relationship with respect to the wall 168 of the cupped member 169, as will be more particularly pointed out hereinafter. The valve body 177 has a longitudinal passage therethrough controlled by a valve 185, which is shown as being a "Schrader" valve, said valve having a stem 186 extending above the upper end of the valve body 177.

The valve 177a provides communication between the passage or chamber 173 and the chamber 128, the latter having a plurality of peripheral openings 187 communicating with the groove 103 which in turn communicates with atmosphere by way of the passage 104 and the conduit 68.

At the upper end of the casing 101 the interior of said casing is enlarged at 188 with a shoulder 189 at the bottom thereof, and the upper end of the chamber 128 is closed by a flexible diaphragm 190 which will be termed a low differential diaphragm, and which has an effective area substantially larger than the diaphragm 141.

The diaphragm 190 is marginally secured in the casing 101 by having a marginal portion secured between the shoulder 189 and an annular member 191 which is L-shaped in cross-section. Said member 191 is secured in position by a split ring 192 received in a groove provided therefor in the wall of the casing 101. There is also a groove in the shoulder 189 for reception of a sealing ring 193.

The diaphragm 190 has a central opening therein, and an annular portion about said opening is secured between a pair of plates 194 and 195 on the lower and upper sides respectively, said plates having aligned axial openings therein and are threaded on a sleeve 196.

The plate 194 has a boss 197 which extends through the opening in the diaphragm, and the plate 195 has a recess somewhat larger than the boss to thereby provide space for a sealing ring 198 about the opening in the diaphragm.

The plate 195 has an upwardly extending boss 199 provided with a recess for reception of a sealing ring 200 which provides a seal between the recess within which it is received and a lock nut 201, also threaded onto the sleeve 196. The plate 195 also has an outwardly extending flange 202 at the upper end thereof, which extends outwardly and is slidably received within the annular member 191, said flange having a limited range of movement between the horizontal portion 203 of the member 191 and the split ring 192 which extends inwardly a sufficient distance to be within the path of said flange 202. The flange 202 also has openings 205 for pressure communication therethrough, thereby permitting the application of pressure in the chamber 112 and the upper end 112a of the casing 101 on the upper side of the convolution 206 of the diaphragm 190. Inasmuch as the pressure in the portion 112a of the casing is the same as that in the chamber 112, said portion 112a will be hereinafter considered as part of the chamber 112.

The sleeve 196 has an axial bore therethrough, which is threaded for reception of an adjustment screw 210, the lower end of said screw being extended below the lower end of the sleeve 196 for engagement with the valve stem 186 under certain operating conditions hereinafter to be described. The screw 210 is located in adjusted positions by means of a lock nut 211.

A spring retainer 212 is disposed on the lower end of the screw 210 and abuts against the lower end of the sleeve 196, and the diaphragms 141 and 190 are urged away from each other by means of a spring 213 which reacts between said spring retainer 212 and the flange 178 on the body of the valve 177a.

Figure 6:
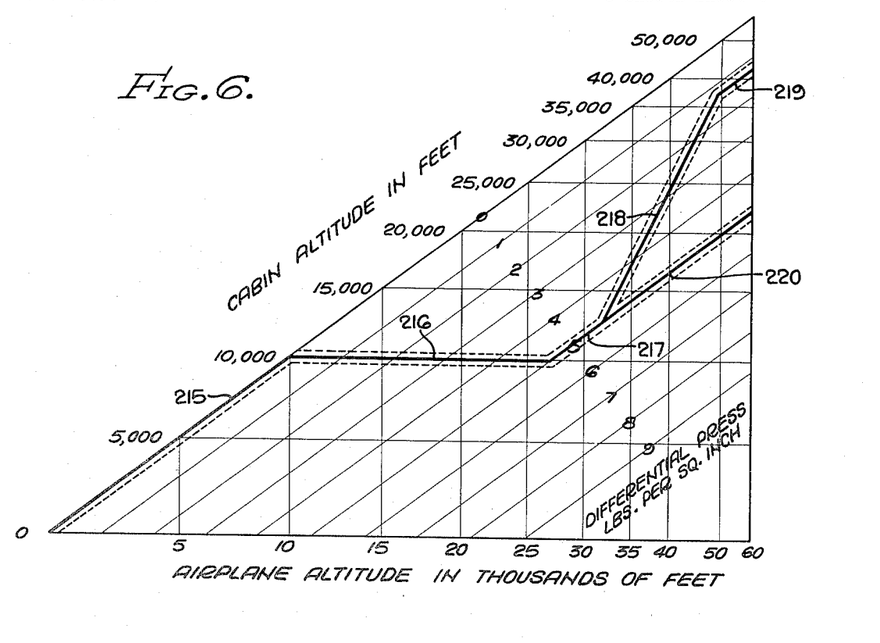
Fig. 6 is a graph showing, by way of example, a flight schedule.

Fig. 6 shows, by way of example, a flight schedule which may be provided with the present invention. In the flight schedule illustrated the unpressurized flight extends up to a predetermined altitude here shown as about 10,000 feet, as indicated by line 215. The isobaric range extends from the first predetermined altitude to a second predetermined altitude which is shown as 27,500 feet, and the isobaric range is indicated by the line 216. Between the second predetermined altitude and a third predetermined altitude, shown as 32,000 feet, the device maintains a high differential pressure between that in the cabin and ambient atmosphere as shown by line 217. The ratio range, indicated by line 218, extends from a third predetermined altitude up to a fourth predetermined altitude, shown as approximately 50,000 feet. Above the fourth predetermined altitude the present device maintains a low differential between the pressure in the cabin and ambient atmosphere, as indicated by line 219. The extended portion 220 of line 217 shows the cabin pressure maintained when the ratio control mechanism is locked out.

Referring to Figs. 4 and 5, it will be apparent that the high differential assembly comprising the diaphragm 141 and valve 177a floats, and that the low differential assembly, comprising the diaphragm 190, plates 194 and 195, sleeve 196 and adjustment screw 210, also floats. These two assemblies are urged apart by the spring 213 and also by the pressure in the chamber 128 acting on the interior sides thereof. The opposite side of the diaphragm 141 is subjected to a pressure in the control chamber 28 which is transmitted through the ports 176 and into the central opening 173 of the solenoid. The opposite side of the low differential diaphragm assembly is also subjected to control chamber pressure, that is, the pressure in chamber 28, which is transmitted through the passages 111, 110 and port 113, to the chamber 112.

The solenoid coil 135 is connected to any suitable source of electric current, not shown, by means of wires 225, which lead to a socket 226 attached to the regulator head 25, a plug 227, and wires 228. Interposed in the circuit for the solenoid is a switch 229 suitably connected into said circuit by wires 230.

When the switch 229 is closed, the solenoid coil 135 is energized, thereby attracting the armature 150, and moving same to the position shown in Fig. 4, against the resistance of spring 161. This movement of the armature raises the ratio control assembly, which includes the bellows 170 and cupped member 169, so as to position same in approximately the position shown in Fig. 4.

The isobaric bellows 88, which may be termed pressure responsive means, and the pressure responsive mechanism 100, control the pressure in the control chamber 28. This pressure is effective on one side of the movable valve assembly, and particularly the cover plate 47, for urging the valve assembly in a direction to effect closing of the outlet opening 56. Atmospheric pressure prevails within the region defined by the valve member 42 and diaphragm 49, and cabin pressure prevails in the chamber 51 transmitted through the openings 52 in the cover 47. The cabin pressure in chamber 51 acts on the cover 47 in a direction urging the outflow valve open, and it is to be noted that the valve assembly is balanced in respect to atmospheric pressure by reason of the portion 43 of the valve member 41. The inner effective surface 232 of the portion 43 is of substantially the same effective area as the area of the convolution 231 of the diaphragm 49 subjected to atmospheric pressure. With this arrangement a reduction of pressure in the chamber 28 will result in opening movement of the outflow valve, and an increase in pressure in said chamber 28 will result in closing movement of said outflow valve. Also, changes in pressure in the cabin will result in movements of the outflow valve. An increase in pressure in the cabin will move said valve in the opening direction and a decrease in pressure will result in closing movement of said valve. This operation will result in the regulation of the flow of air from the cabin so as to control cabin pressure in accordance with the pressure in the control pressure chamber 28. Thus, by controlling the pressure in the chamber 28 by means of the isobaric control mechanism and the mechanism of the unit 100, cabin pressure is controlled.

Assuming the aircraft is taking off from substantially sea level, the valve 83 of the isobaric control is open, and substantially atmospheric pressure prevails in the chamber 28. This condition will exist until the aircraft reaches approximately 10,000 feet, and hence, the pressure in the control chamber 28, and consequently, cabin pressure, will follow atmospheric pressure. Actually, cabin pressure will be slightly higher than atmospheric pressure due to the spring 60 urging the outflow valve assembly in the closing direction.

When the aircraft reaches the predetermined altitude, 10,000 feet, at which the isobaric range begins, the bellows 88 will have expanded sufficiently so as to cause the valve 83 to restrict the connection between the chamber 28 and atmosphere. It is to be understood, of course, that air is bled into the chamber 28 through the restricted bleed 67. As the aircraft increases in altitude, the bellows 88 so controls the atmospheric connection with the chamber 28 as to maintain a substantially constant pressure level in said chamber, and hence, in the cabin. As pointed out hereinabove, the high differential assembly, comprising the diaphragm 141 and the valve 177a, and the low differential assembly, comprising the diaphragm 190, plates 194 and 195, and the adjustment screw 210, are free to "float." This floating movement of the diaphragm 190 is limited by the movement of the plate 195 engaging either a portion 203 of the member 191 or the ring 192. In other words, the range of movement of the diaphragm 190 is the distance the plate 195 may move between said part 203 and the ring 192.

The chamber 128 is connected with true static or ambient atmospheric pressure, and when said pressure is less than the pressure in the control chamber, the high-low differential assemblies will float downwardly until the flange 202 of the plate 195 engages the part 203 of the member 191. This is due to the difference in areas of the diaphragms 141 and 190. The diaphragm 190 has a larger area exposed to control chamber pressure than the diaphragm 141, the opposite sides of said diaphragms being exposed to atmospheric pressure.

At the same time the diaphragms will be urged toward each other against the force of the spring 213. It is to be understood that the above operation of the mechanism occurs as the aircraft ascends in the unpressurized and isobaric ranges, and it is also be be understood that the valve 177a remains closed.

As the aircraft ascends in the unpressurized and isobaric ranges, the diaphragm 141 is progressively moved upwardly, compressing the spring 213. As the aircraft enters the high differential range, the valve stem 186 contacts the adjacent end of the screw 210 and the valve 177a is opened to meter air from the chamber 173 and hence, from the control chamber 28, to atmosphere by way of the chamber 128. Thus, pressure in the regulator control chamber 28 is regulated in accordance with the differential of pressures across the diaphragm 141 to thereby maintain a high differential of pressure between that in the control chamber 28, and hence, in the cabin and atmosphere.

Assuming the solenoid 135 is energized so as to position the ratio control unit 158 as shown in Fig. 4, the mechanism will provide a ratio control when the aircraft enters the ratio range. This is caused by the expansion of the bellows 170 as altitude is gained, resulting, when the ratio range is entered, in the wall 168 contacting the adjacent end of the valve body 177, thereby overriding the action of the differential diaphragm 141 and causing the valve 177a to meter air from the control chamber in accordance with the ratio flight schedule. When the wall 168 engages said end of the valve body 177, air may enter the passage through the valve 177a through notches 235 in the lower free end of said valve body.

As the upper limit of the ratio range is approached the differential pressure across the low differential diaphragm 190 decreases to the point where the force of spring 213 moves the diaphragm 190 upwardly so as to move the screw 210 away from the valve stem 186 of the metering valve 177a. Further expansion of the bellows 170 is prevented by the stop 175 which is engaged by the wall 171 of the cupped member 169. Upon further ascent of the aircraft the cabin pressure is then regulated in accordance with the differential of pressure across the diaphragm 190.

The foregoing operation of the ratio and low differential is for combat conditions. When not flying under combat conditions the ratio lockout switch 229 is open, thereby deenergizing the solenoid coil 135. The spring 161 then urges the ratio bellows assembly away from and out of contact with the valve body 177 so that the ratio control is then ineffective to control the valve 177a. At the same time, the low differential diaphragm 190 moves downwardly until the flange 202 of the plate 195 engages the part 203 of the member 191. The low differential mechanism then becomes ineffective to control the valve 177a. The above movements of the ratio assembly and the diaphragm 190 result in the closing of the valve 177a, so that pressure begins to build up in the chamber 173, and hence, in the control chamber pressure 28, at a rate which is determined by the size of the bleed orifice 67 in the regulator control chamber head. The calibration of the bleed orifice 67 is such that cabin pressurization does not exceed 2.0 inches Hg. per minute. When the cabin pressure approaches a differential over atmosphere of 5.0 p. s. i., the diaphragm 141 has moved the valve 177a upwardly to the point where the outer end of the stem 186 again engages the adjacent end of the screw 210 so that the regulator then goes on high differential regulation.

The adjustment screw 210 is a calibration means for the differential ranges, and the ratio unit 158 is adjustable relative to the armature 150. The various parts are so calibrated as to provide the above described operation; but it is to be understood that the specific ranges of the flight schedule, hereinabove described, may vary, said flight being merely by way of example.

Figures 7, 8:
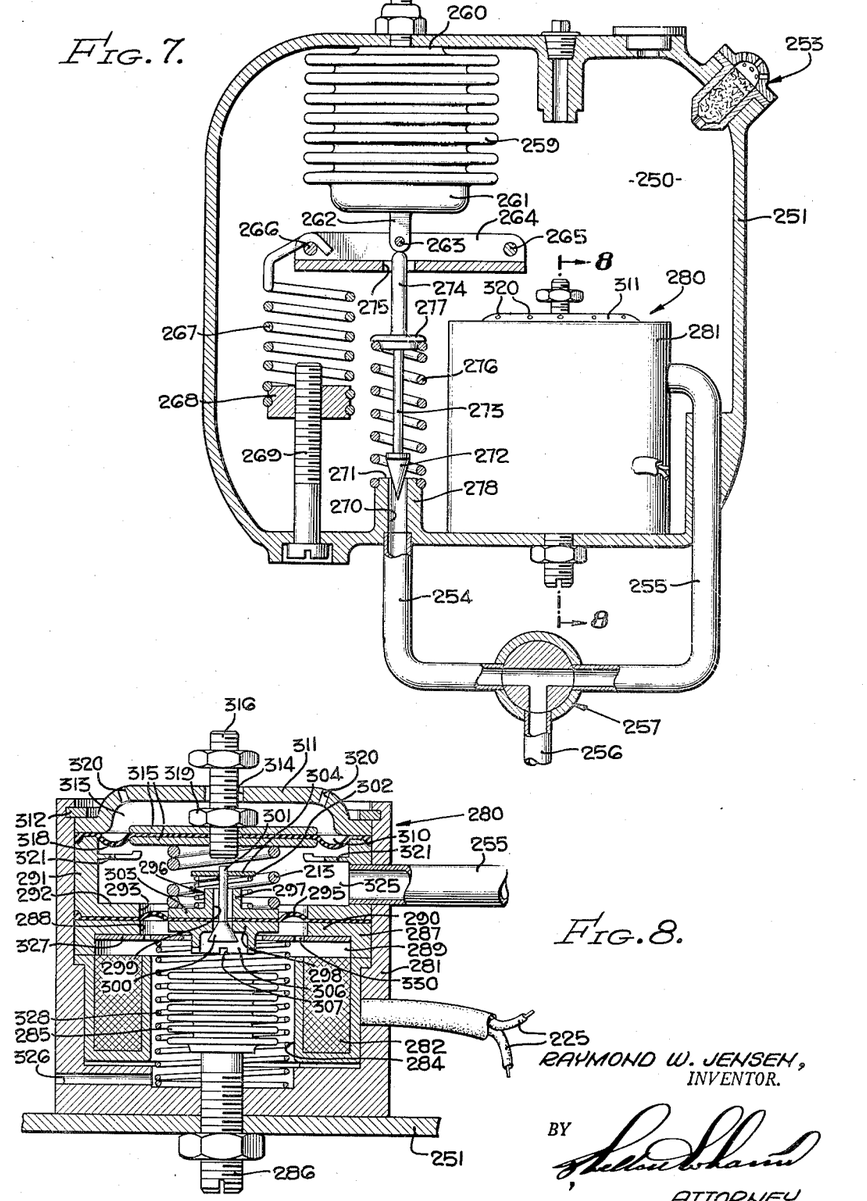
Fig. 7 is a sectional view of a pressure regulating or control mechanism embodying an alternative arrangement of the invention.
Fig. 8 is a sectional view taken on line 8—8 of Fig. 7.

The hereinabove described mechanism includes a ratio lockout which is effective when the solenoid is deenergized. In Figs. 7 and 8 there is disclosed an arrangement wherein the lockout is ineffective when the solenoid is deenergized.

Figure 9:
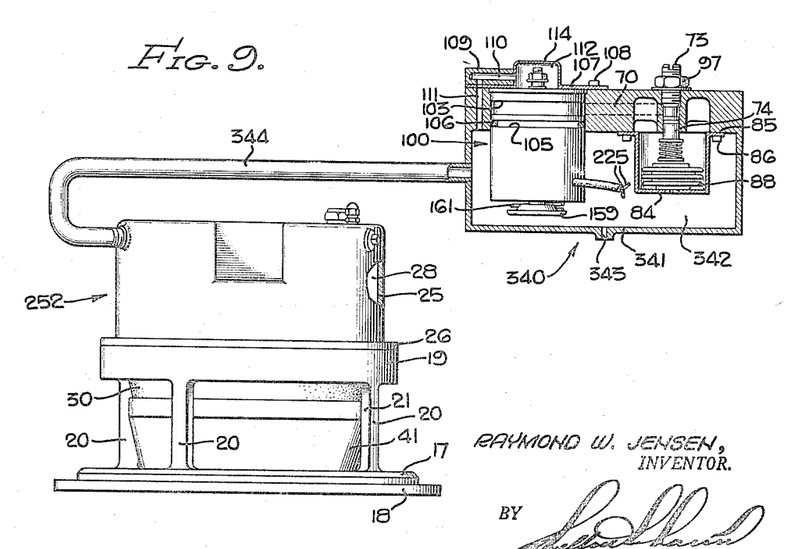
Fig. 9 shows an alternative arrangement of a pressure regulating mechanism embodying the present invention.

Referring more particularly to Figs. 7 and 8, the device includes a control chamber 250 defined by walls 251, which may form part of a unitary outflow control mechanism or which may serve as a control chamber having connections with slave units, such as shown at 252 in Fig. 9.

There is a calibrated bleed 253 into the control chamber 250 from a source of higher pressure, such as the cabin. The control chamber also has a pair of connections or conduits 254 and 255, connected to a conduit 256, which leads to true static or ambient atmospheric pressure which is, of course, a region of lower pressure. The conduits 254 and 255 are connected to the conduit 256 by means of a three-way valve, indicated generally at 257. The valve may be positioned to connect both the conduits 254 and 255 with atmosphere, or it may be adjusted to connect one or the other of these conduits to atmosphere to thereby cut out the isobaric control or the dual differential and ratio control, as will be brought out more particularly hereinafter.

The isobaric control comprises, as shown, an evacuated bellows 259 having one end, 260, anchored to a wall of the control chamber and having the opposite end, 261, movable. The wall 261 is provided with a stem 262 pivoted at 263 to a lever 264 at a point intermediate the ends of said lever. One end of said lever is pivoted at 265 to a fixed support, not shown, and the other end of said lever is provided with a pin 266 to which one end of a spring 267 is connected. The other end of said spring is connected to a member 268 threaded on an adjustment screw 269 for varying the tension of said spring 267 which urges expansion of the bellows 259.

The conduit 254 is connected to an outlet passage 270 having a valve seat 271 cooperable with a valve head 272. The valve head is provided with a stem 273 having a part 274 engageable with the stem 262 through an opening 275 in the lever 264. A spring 276 urges the valve 272 in the opening direction, said spring reacting between a spring retainer 277 connected to the valve stem 273 and a boss 278 having the passage 270 therein.

The conduit 255 has a connection with the dual differential and ratio control unit, indicated generally at 280. This unit comprises a casing 281 which is hollow, and in the lower end of which, as shown in Fig. 8, is disposed a solenoid coil 282 connected into the circuit, as described hereinabove, by wires 225. The coil 282 has an axial opening 284 therethrough, in which is disposed the ratio bellows 285 having one end secured to an adjustment screw 286 and having the opposite end movable.

Above the coil 282 is an annular member 287 having a central opening 288 therein, and a recess 289 providing a space between the adjacent end of the coil 282 and the inwardly extending portion 290 of the member 287. Above the member 287 is an annular member 291 having an internal flange 292 with an opening 293 therein, in register with the opening 288 of the member 287. Between the parts 290 and 292 a high differential diaphragm 295 is marginally clamped, said diaphragm carrying an axially arranged metering valve, indicated generally at 296, in axial relationship. The valve 296 includes a valve body comprising an upper part 297 and a lower part 298 through which is a flow passage 299 controlled by a valve member 300. The valve member 300 is provided with a stem 301 which extends upwardly beyond the upper end of the valve body, and said valve is urged in the closing direction by a spring 302 reacting between a flange 303 of the upper part of the valve body and a spring retainer 304 on the stem 301. The lower part 298 of the valve body is also provided with a flange, and a central area of the diaphragm 295 is clamped between said valve body parts. The diaphragm is provided with an opening therein to permit the flow of air through the valve body.

The valve body part 298 has a plurality of projections 306 which are annularly spaced apart, said projections being engageable by the adjacent movable end of the bellows 285 when the latter expands sufficiently. The spaces 307 between the parts 306 permit the flow of air through the valve body when the bellows is in engagement with the projections 306.

A low differential bellows 310 is marginally clamped between the upper end of the annular member 291 and a cap 311 secured in position by a snap ring 312. The cap 311 is in the form of a shallow inverted cup and said cap defines, with the diaphragm 310, a chamber 313, communicating with the control chamber 250 by way of a central opening 314. A pair of plates 315 are disposed on opposite sides of the diaphragm and are threaded onto an adjustment screw 316 which extends through the opening 314 and is of smaller diameter than said opening to permit the flow of air therepast. The plates 315 are of smaller diameter than the member 291 and provide a flexible convoluted area 318 so that the diaphragm will move properly. A nut 319 is provided on the screw 316 just above the upper plate 315 and is adapted to engage the adjacent part of the cap 311 to thereby limit upward movement of the diaphragm 310. When the nut 319 engages the cap, air may also enter the chamber 313 from the control chamber by way of openings 320 in the cap.

Downward movement of the diaphragm is limited by the angular arms 321 which extend inwardly from the member 291.

A chamber 325 is provided between the diaphragms 295 and 310, and said chamber is in communication with the conduit 255 so that atmospheric pressure prevails in said chamber 325 when the valve 257 is in the position shown in Fig. 7 or when the valve is moved to another position communicating said conduit 255 with atmosphere and cutting off the conduit 254 therefrom.

The chamber 284 is connected with the control chamber by means of a bore 326.

Within the space 289 is a solenoid armature comprising a plate 327 urged upwardly by a light spring 328, the upward movement of said plate being limited by engagement with the part 290 of the member 287. The plate 327 has a central opening through which the projections 306 extend, and also is provided with a plurality of perforations 330 for the communication of pressure from the chamber 284 to the under side of the diaphragm 295.

Thus the upper side of the diaphragm 310 is subjected to control chamber pressure and the under side of the diaphragm 295 is likewise subjected to control chamber pressure. The opposite sides of said diaphragms are subjected to atmospheric pressure and the ratio bellows 285 is subjected to control chamber pressure.

When the solenoid coil 282 is deenergized, the spring 328 urges the armature 327 to its upper limit of movement and the mechanism functions in the manner hereinabove described in connection with the arrangement shown in Figs. 1 to 5, it being noted that under these conditions the armature 327 serves to limit expansion of the ratio bellows 285 for the same purpose that the stop 175 limits the expansion of the ratio bellows 170 in the arrangement of Figs. 4 and 5. When the solenoid is energized, the armature 327 is pulled downwardly and moves the upper end of the bellows 285 to a position whereat it is inoperative so that the mechanism will function on high differential regulation when the aircraft is above the isobaric range.

Referring to Fig. 9, the mechanism 252 is substantially the same as that shown in Figs. 1, 2 and 3 except that the isobaric mechanism and the unit or assembly 100 are lacking, so that the device acts merely as an outflow valve and the mechanism for controlling the pressure in the head is controlled by a separate unit such as shown generally at 340. The pressure control mechanism 340 comprises a housing 341 defining a control pressure chamber 342. Mechanism for controlling the pressure in said chamber includes the isobaric bellows 88 and the unit or assembly 100, said bellows 88 and unit 100 being disposed within the control pressure chamber 342. A bleed from a source of higher pressure, such as the cabin, may be into the pressure chamber 28 of the mechanism 252, but is shown as a bleed 343 into the control pressure chamber 342, and there is also an atmospheric connection. The isobaric mechanism and the unit 100 control the flow of air relative to the control pressure chamber 342 by controlling the atmospheric connection as in the previously described arrangements, so that said isobaric mechanism and the unit 100 control the pressure within the chamber 342, which pressure is transmitted to the head of the mechanism 252 by means of a conduit 344. It is to be understood, of course, that other slave units, such as mechanism 252, may be used and suitably connected with the control chamber 342.

Other types of outflow valve mechanisms may be used wherein the outflow valve is controlled, at least in part, by the pressure within a control chamber, the pressure control mechanism of the present invention controlling the pressure in said control chamber. Such pressure control mechanism may be either within the head of the outflow valve or in a separate unit, or otherwise arranged so that the pressure responsive means thereof will be subjected to the various pressures as hereinabove described.

I claim:

1. In mechanism for controlling the pressure within an enclosure having an opening therein for the flow of fluid relative to said enclosure: valve means for controlling said opening including a pressure sensitive part subjected on one side to enclosure pressure; means defining a control pressure chamber, the other side of said part being subjected to the pressure in said chamber; means for controlling the pressure in said control chamber including a pair of movable aligned pressure sensitive elements, the sides facing each other being subjected to ambient atmospheric pressure and the opposite sides being subjected to control chamber pressure, one of said elements being of larger effective area than the other of said elements; valve means for controlling the flow of air between said control chamber and ambient atmosphere, said valve means being movably carried by the smaller of said pressure sensitive elements, said elements being movable in substantial unison with each other and movable independently of each other; spaced stop means for limiting the movement of the larger of said pressure sensitive elements; yielding means urging said elements apart; an aligned absolute pressure responsive device cooperable with the smaller of said pressure responsive elements when the pressure in the control chamber has dropped to a predetermined value; and electrical means for rendering said absolute pressure responsive device inoperative, the valve means carried by the smaller pressure responsive element being opened when said pressure responsive elements are in a predetermined relationship with respect to each other.

2. The invention defined by claim 1, wherein there is a solenoid coil having an armature controlling the absolute pressure responsive device, said armature moving said absolute pressure responsive device to its operative position when the solenoid coil is energized.

3. The invention defined by claim 1, including a solenoid coil and an armature for holding the absolute pressure responsive device in an inoperative position when the solenoid coil is energized.

4. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including pressure responsive means responsive to the absolute pressure in the control chamber for maintaining the control chamber pressure, and hence, the enclosing pressure, at a substantially constant level in one altitude range; a pair of differential pressure responsive elements, one of which is smaller than the other in effective area, each of said pressure responsive elements having one side subjected to control chamber pressure and the opposite side subjected to ambient atmospheric pressure; valve means for controlling the flow of fluid relative to said control chamber, said valve means being cooperatively controlled by said pressure responsive elements; an absolute pressure responsive device associated with the smaller of said pressure responsive elements, said absolute pressure responsive device being subjected to the pressure in said control chamber; means limiting the movement of the larger pressure responsive element in both directions but permitting limited movement thereof, said pressure responsive elements and pressure responsive device being associated with each other in such a manner that the smaller element controls said valve means so as to maintain a relatively high differential pressure between that in the control chamber and ambient atmospheric pressure through a higher altitude range, the smaller pressure responsive element and the absolute pressure responsive device maintaining the control chamber pressure at a predetermined ratio with respect to ambient atmospheric pressure through a still higher altitude range and the larger pressure responsive element maintaining the pressure in the control chamber at a relatively lower predetermined fixed differential with respect to ambient atmospheric pressure in an altitude range above the ratio range; and means for locking out the absolute pressure responsive device.

5. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in the control chamber in an isobaric range of operation, means for maintaining a substantially fixed relatively high differential pressure between that in the control chamber and ambient atmosphere through a high differential range above the isobaric range; means, including a differential pressure responsive element operable automatically under predetermined pressure conditions to maintain a substantially fixed predetermined relatively low differential pressure between that in the control chamber and ambient atmosphere in an altitude range above the high differential range; and pressure responsive means responsive to predetermined pressure conditions, for maintaining a predetermined ratio between the pressure in the control chamber and ambient atmospheric pressure in an altitude range between the high and low differential ranges.

6. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in the control chamber in an isobaric range of operation, means for maintaining a substantially fixed relatively high differential pressure between that in the control chamber and ambient atmosphere through a high differential range above the isobaric range; pressure responsive means, responsive to predetermined pressure conditions, adapted to maintain a predetermined ratio between the pressure in the control chamber and ambient atmospheric pressure in an altitude range above the high differential range; means for rendering the ratio means inoperative; and means, including differential pressure responsive means operable automatically to maintain a substantially fixed predetermined relatively low differential pressure between that in the control chamber and ambient atmosphere in the altitude range above the ratio range.

7. In pressure control mechanism: a pair of differential pressure responsive elements, each of said elements being adapted to be subjected on one side to a pressure to be controlled and on the opposite side to a reference pressure, one of said elements having effective areas larger than the other of said elements; spaced stop means for limiting the movement of one of said elements; valve means controlled by said elements, said valve means being controlled by one of the elements under predetermined differential pressure conditions on the opposite side of said element and controlled by the other element under predetermined differential pressure conditions; and an absolute pressure responsive device subjected and responsive to the pressure to be controlled, said device cooperating with one of said elements when the pressure to be controlled drops to a predetermined value to thereby maintain the control chamber pressure in accordance with a predetermined ratio with respect to the reference pressure.

8. In pressure control mechanism: a pair of differential pressure responsive elements, each of said elements being adapted to be subjected on one side to a pressure to be controlled and on the opposite side to a reference pressure, one of said elements having effective areas larger than the other of said elements; spaced stop means for limiting the movement of one of said elements; valve means controlled by said elements, said valve means being controlled by one of the elements under predetermined differential pressure conditions on the opposite side of said element and controlled by the other element under predetermined differential pressure conditions; an absolute pressure responsive device subjected and responsive to the pressure to be controlled, said device cooperating with one of said elements when the pressure to be controlled drops to a predetermined value to thereby maintain the control chamber pressure in accordance with a predetermined ratio with respect to the reference pressure; and electrical means for preventing said cooperative action between the absolute pressure responsive device and element.

9. In pressure control mechanism: a pair of spaced differential pressure responsive elements arranged in substantially axial alignment; means defining a chamber in cooperation with said elements so that adjacent sides of said elements are subjected to the pressure in said chamber, the opposite sides of said elements being exposed to a common pressure to be controlled, one of said elements having effective pressure areas larger than the pressure areas of the other element; yielding means between said elements urging same apart, said elements being adapted to move in substantial unison with each other and also move independently of each other; means limiting the movements of the larger element; and a valve controlling the flow of pressure relative to said chamber, said valve being opened when said elements have less than a predetermined spacing from each other.

10. The invention defined by claim 9, wherein said valve is axially arranged with respect to said elements and is carried by the smaller of said elements.

11. The invention defined by claim 9, wherein said valve is axially arranged with respect to said elements and is carried by the smaller of said elements; and an absolute pressure responsive device aligned with said valve and said elements, said absolute pressure responsive device being subjected to the same pressure as the exterior sides of said elements and adapted to cooperate with the smaller of said elements when said pressure is below a predetermined value.

12. The invention defined by claim 9, wherein said valve is axially arranged with respect to said elements and is carried by the smaller of said elements; an absolute pressure responsive device aligned with said valve and said elements, said absolute pressure responsive device being subjected to the same pressure as the exterior sides of said elements and adapted to cooperate with the smaller of said elements when said pressure is below a predetermined value; and means for limiting movement of said device toward said smaller pressure responsive element.

13. The invention defined by claim 9, wherein said valve is axially arranged with respect to said elements and is carried by the smaller of said elements; an absolute pressure responsive device aligned with said valve and said elements, said absolute pressure responsive device being subjected to the same pressure as the exterior sides of said elements and adapted to cooperate with the smaller of said elements when said pressure is below a predetermined value; means for limiting movement of said device toward said smaller pressure responsive element; and electrical means for moving the absolute pressure responsive device to a position whereat it is unable to cooperate with the smaller pressure responsive element.

14. The invention defined by claim 9, wherein said valve is axially arranged with respect to said elements and is carried by the smaller of said elements; an absolute pressure responsive device aligned with said valve and said elements, said absolute pressure responsive device being subjected to the same pressure as the exterior sides of said elements and adapted to cooperate with the smaller of said elements when said pressure is below a predetermined value; means for limiting movement of said device toward said smaller pressure responsive element; and electrical means for limiting movement of said pressure responsive device toward said smaller pressure responsive element so as to prevent cooperative action therewith.

15. In pressure responsive mechanism: means defining a chamber for a reference pressure; a pair of differential pressure responsive elements, each having one side subjected to the pressure in said chamber and the opposite side subjected to a pressure to be controlled, one of said elements being of larger effective area than the other of said elements, said elements being adapted to move in substantial unison with each other and also independently of each other; means for limiting the movements of the larger element in both directions; yielding means interconnecting said elements; and valve means controlling the flow of fluid relative to said chamber, said valve means being operatively connected with said pressure responsive elements and being opened when said elements are in predetermined positions relative to each other.

16. The invention defined by claim 15, including an absolute pressure responsive device of smaller area than the smaller pressure responsive element, said absolute pressure responsive device being subjected to the pressure to be controlled and cooperable with the smaller of said elements when said pressure is below a predetermined value; and means for limiting movement of said device in the cooperative direction.

17. Pressure control mechanism, comprising: differential pressure responsive means, including a movable wall responsive to the differential of the pressures on opposite sides thereof; absolute pressure responsive means subjected to one of said pressures and engageable with said wall when said one pressure is below a predetermined value; and electrically operated means for rendering said absolute pressure responsive means inoperative.

18. In mechanism for controlling the pressure within an enclosure having an opening therein for the flow of fluid relative to said enclosure: valve means for controlling said opening including a pressure sensitive part subjected on one side to enclosure pressure; means defining a control pressure chamber, the other side of said part being subjected to the pressure in said chamber; means for controlling the pressure in said control chamber including a pair of movable aligned pressure sensitive elements, the sides facing each other being subjected to ambient atmospheric pressure and the opposite sides being subjected to control chamber pressure, one of said elements being of larger effective area than the other of said elements; valve means for controlling the flow of air between said control chamber and ambient atmosphere, said valve means being movably carried by the smaller of said pressure sensitive elements, said elements being movable in substantial unison with each other and movable independently of each other; spaced stop means for limiting the movement of the larger of said pressure sensitive elements; yielding means urging said elements apart; an aligned absolute pressure responsive device cooperable with the smaller of said pressure responsive elements when the pressure in the control chamber has dropped to a predetermined value; and means for bodily moving said absolute pressure responsive means to an inoperative position.

19. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in the control chamber in an isobaric range of operation, means for maintaining a substantially fixed relatively high differential pressure between that in the control chamber and ambient atmosphere through a high differential range above the isobaric range, and means for maintaining a substantially fixed predetermined relatively low differential pressure between that in the control chamber and ambient atmosphere in an altitude range above the high differential range; and pressure responsive means automatically operating to maintain a predetermined ratio between the pressure in the control chamber and ambient atmospheric pressure in an altitude range between the high and low differential ranges.

20. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in the control chamber in an isobaric range of operation, means for maintaining a substantially fixed relatively high differential pressure between that in the control chamber and ambient atmosphere through a high differential range above the isobaric range, means for maintaining a substantially fixed predetermined relatively low differential pressure between that in the control chamber and ambient atmosphere in an altitude range above the high differential range, automatically operating pressure responsive means for maintaining a predetermined ratio between the pressure in the control chamber and ambient atmospheric pressure in an altitude range between the high and low differential ranges; and means for rendering the ratio means inoperative.

21. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in said control chamber in an isobaric range of operation, movable wall means responsive to variations in the differential of pressure on opposite sides thereof for maintaining substantially fixed, relatively high differential pressure between that in the control chamber and ambient atmosphere through a high differential range above the isobaric range, movable wall means responsive to variations in differential of pressure on opposite sides thereof automatically operating to maintain a substantially fixed predetermined relatively low differential pressure between that in the control chamber and ambient atmosphere in an altitude range above the high differential range, and means cooperable with one of said movable wall means under predetermined pressure conditions automatically operating to maintain a predetermined ratio between the pressure and the ambient atmospheric pressure in an altitude range between the high and low differential ranges.

22. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in said control chamber in an isobaric range of operation, movable wall means responsive to variations in the differential of pressure on opposite sides thereof for maintaining substantially fixed, relatively high differential pressure between that in the control chamber and ambient atmosphere through a high differential range above the isobaric range, movable wall means responsive to variations in differential of pressure on opposite sides thereof automatically operating to maintain a substantially fixed predetermined relatively low differential pressure between that in the control chamber and ambient atmosphere in an altitude range above the high differential range, means cooperable with one of said movable wall means under predetermined pressure conditions automatically operating to maintain a predetermined ratio between the pressure and the ambient atmospheric pressure in an altitude range between the high and low differential ranges; and means for preventing cooperation of the ratio means with said movable wall means.

23. In pressure control mechanism: differential pressure responsive means including a movable wall responsive to variations in the differential of pressure on opposite sides thereof; absolute pressure responsive means subjected to one of said pressures and engageable with said wall when said one pressure is below a predetermined value; and means for rendering said absolute pressure responsive means inoperative, said means including electrical means for bodily moving said absolute pressure responsive means.

24. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including a pressure responsive device for maintaining a substantially constant pressure level in the control chamber in an isobaric range of operation, means responsive to predetermined pressure for maintaining a substantially fixed relatively high differential pressure between that in the control chamber and ambient atmosphere to a high differential range above the isobaric range, means responsive to predetermined pressure conditions operating automatically to maintain a predetermined ratio between the pressure in the control chamber and ambient atmospheric pressure in an altitude range above the differential range, and differential pressure responsive means responsive to predetermined pressure conditions for maintaining a substantially fixed predetermined relatively low differential pressure between that in the control chamber and ambient atmosphere in an altitude range above said ratio range.

25. In mechanism for controlling the pressure within an enclosure: a pressure responsive part subjected on one side to enclosure pressure; means defining a control pressure chamber, the opposite side of said part being subjected to the pressure in said chamber; means for controlling the pressure in said control chamber including means for maintaining a substantially constant pressure level in the control chamber in an isobaric range of operation, means for maintaining a substantially fixed relatively high differential pressure between that in the control chamber and ambient atmosphere through a high differential range above the isobaric range, means for maintaining a substantially fixed predetermined relatively low differential pressure between that in the control chamber and ambient atmosphere in an altitude range above the high differential range, automatically operating pressure responsive means for maintaining a predetermined ratio between the pressure and the control chamber and ambient atmospheric pressure in an altitude range between the high and low differential ranges; and means operable at will for rendering the ratio means inoperative.

References Cited in the file of this patent

UNITED STATES PATENTS

| | | |
|---|---|---|
| 1,853,194 | Bogle | Apr. 12, 1932 |
| 2,433,206 | Dube | Dec. 23, 1947 |
| 2,463,487 | Widgery et al. | Mar. 1, 1949 |
| 2,463,492 | Arthur | Mar. 1, 1949 |
| 2,484,848 | Paget | Oct. 18, 1949 |
| 2,498,633 | Arthur | Feb. 28, 1950 |
| 2,549,673 | Del Mar | Apr. 17, 1951 |
| 2,610,564 | Cooper et al. | Sept. 16, 1952 |